United States Patent
Hilmersson (10) Patent No.: US 6,179,519 B1
(45) Date of Patent: Jan. 30, 2001

(54) DEVICE AND A METHOD FOR MOVING AN OBJECT

(75) Inventor: Stefan Hilmersson, Holsbybrunn (SE)

(73) Assignee: Aquajet Systems Holdings AB (SE)

(*) Notice: Under 35 U.S.C. 154(b), the term of this patent shall be extended for 0 days.

(21) Appl. No.: 09/284,102

(22) PCT Filed: Oct. 6, 1997

(86) PCT No.: PCT/SE97/01666

§ 371 Date: Apr. 7, 1999

§ 102(e) Date: Apr. 7, 1999

(87) PCT Pub. No.: WO98/15690

PCT Pub. Date: Apr. 16, 1998

(30) Foreign Application Priority Data

Oct. 8, 1996 (SE) .................................................. 9603660

(51) Int. Cl.[7] .......................... E01C 23/08; E01C 23/12; E21C 35/08
(52) U.S. Cl. ................ 404/91; 404/90; 74/103; 299/1.5; 299/17
(58) Field of Search ........................ 404/90, 91; 239/227, 239/752; 299/1.5, 17; 74/103

(56) References Cited

U.S. PATENT DOCUMENTS

| 3,312,980 | * | 4/1967 | Erbach | 74/103 |
|---|---|---|---|---|
| 3,827,187 | * | 8/1974 | Yamamoto et al. | 451/92 |
| 4,081,200 | | 3/1978 | Cheung . | |
| 4,761,037 | * | 8/1988 | Medeot | 299/1.5 |
| 5,361,993 | * | 11/1994 | Andersson | 239/752 |
| 5,500,659 | * | 3/1996 | Curran, Jr. et al. | 347/28 |
| 6,024,147 | * | 2/2000 | Hunter, Jr. | 156/356 |

FOREIGN PATENT DOCUMENTS

| 2 027 776 | | 2/1980 | (GB) . | |
|---|---|---|---|---|
| 2046394 | * | 11/1980 | (GB) | 74/103 |
| WO 85/02211 | | 5/1985 | (WO) . | |
| WO 92/03269 | | 3/1992 | (WO) . | |
| WO 93/14296 | | 7/1993 | (WO) . | |

* cited by examiner

Primary Examiner—Eileen D. Lillis
Assistant Examiner—Gary S. Hartmann
(74) Attorney, Agent, or Firm—Zarley, McKee, Thomte, Voorhees & Sease (57) ABSTRACT

A device and a method for moving an object are based on the fact that the object (8) is pivotable in relation to a base portion (7) about an axis. There is an arrangement (18) for displacing, during pivoting motion of the object, the object substantially parallel to its pivoting plane for the purpose of causing a point of the object to describe a motion in substantially one and the same plane as a consequence of the combined pivoting/displacing.

23 Claims, 8 Drawing Sheets

DEVICE AND A METHOD FOR MOVING AN OBJECT

FIELD OF THE INVENTION AND PRIOR ART

This invention relates to a device for moving an object, which object is pivotably arranged in relation to a base portion about an axis. In addition, the invention relates to a method for moving the object.

Preferably, the object is constituted by a member for treating a material layer. This treatment is first of all intended to be a material removing treatment. Although the layer may consist of other material a concrete layer is preferably concerned herein. Primarily, the treatment is intended to have the purpose to remove weakened material from the layer. It may then be a question of removing weakened concrete from concrete layers on roads, bridges and a variety of building structures, where upon the removed concrete may be replaced by new concrete. It is in this connection specially preferred that the treating member is constituted by a jet member so as to direct a high pressure jet of liquid against the material layer. Thus, it is this high pressure jet of liquid which executes the material removing treatment. Preferably, the high pressure liquid consists of water.

The above mentioned prior art is described, for instance, in our European patent 0 544 775. Therein is described how the base portion represents a part of a carriage movable to and fro along a guiding, a nozzle of the jet member being intended to point obliquely in the motion direction of the carriage whereas the jet member, when reaching the outer positions, is turned over in that way that its nozzle, during the carriage motion in opposite direction, still is pointing obliquely in the motion direction of the carriage. During pivoting the jet member in connection to a change of the motion direction of the carriage, the nozzle of the jet member will describe a curved path of motion, along which the nozzle will present a varying distance to the material layer. This varying distance implies irregular treatment of the material layer. Experiments carried out by us show that even a comparatively small increase of the distance between the nozzle and the material layer surface reduces the treatment result considerably.

OBJECT OF THE INVENTION

The object of the present invention is to create conditions for such an efficient function as possible of the inventive device and the method, respectively, by modifying the motion pattern of the object (jet member).

SUMMARY OF THE INVENTION

According to the invention this object is obtained by providing the device with an arrangement for displacing, during pivoting motion of the object, the object substantially parallel to its pivoting plane for the purpose of causing a point at the object to describe a motion in substantially one and the same plane.

Thus, this fundamental invention concept involves that, despite the object is operated in a pivoting motion, a point at the object will describe a motion in substantially one and the same plane, whereby conditions are created for constancy in the relation between the object and some additional member, for example a planar material layer, which member will be treated by means of the object.

Applied to the art described in the introduction for material removing treatment of a material layer this involves in reality that it is the jet member nozzle which during the pivoting motion of the jet member, thanks to the displacing motion, will describe said motion in substantially one and the same plane. Thus, this implies that the distance from the nozzle to a substantially planar material layer may be, in substance, constant during the pivoting motion of the jet member, i.e. when the jet member is pivoted, an essentially constant result of the material removing treatment will arise since the nozzle always is located in a plane substantially parallel to the plane of the material layer.

It is also to be noted in this connection that the art described creates conditions for placing, during the whole process of treatment, the nozzle of the jet member closer to the material layer to be treated than it has been possible according to prior art according to EP 0 544 775, for instance. According to this art, in fact, it was necessary to locate the nozzle of the jet member at a distance so far from the material layer intended to be treated that the nozzle would not be in contact with the material layer (for example concrete reinforcement present there) when the jet member pivots in the outer positions. Thus, it was according to prior art necessary to let the lowest position of the nozzle of the jet member during the pivoting motions be determining for the distance between the nozzle and the material layer during the remaining part of the process of treatment. This involved an unnecessarily great distance between the nozzle and the material layer with worse efficiency resulting therefrom. A resulting effect of the invention is further that a greater inclination of the direction of the nozzle compared to prior art may be applied since the nozzle always will be at a substantially constant distance to the material layer.

Further advantages and advantageous embodiments of the invention are further disclosed in the claims and in following description.

BRIEF DESCRIPTION OF THE DRAWINGS

With reference to the appended drawings, below follows a specific description of preferred embodiments of the invention cited as examples.

In the drawings.

DETAILED DESCRIPTION OF PREFERRED EMBODIMENTS

Figure 1:
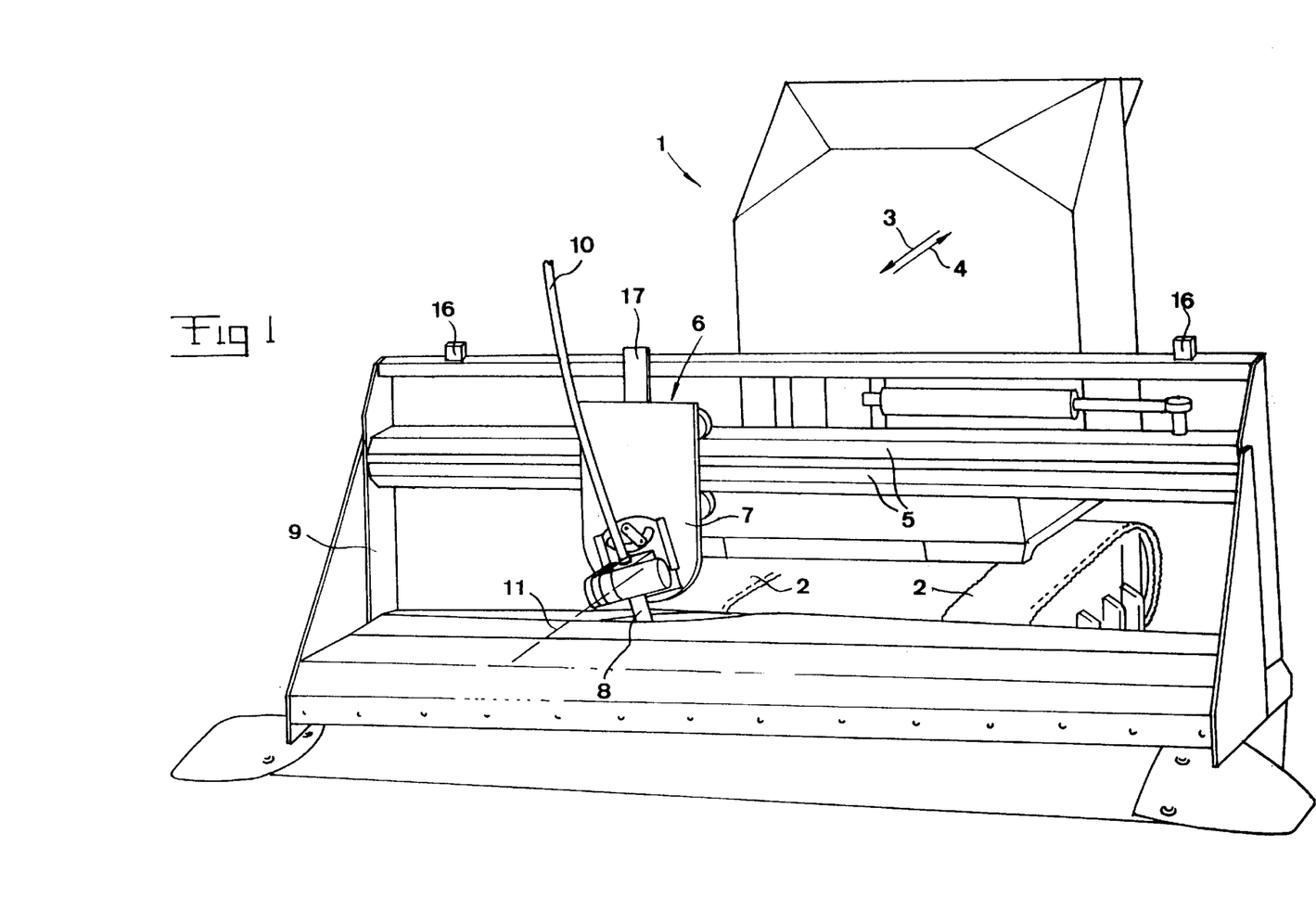
FIG. 1 is a schematic perspective view of a mobile unit, in which the device according to the invention is implemented.

The device according the invention may, as illustrated in FIG. 1, be arranged on a mobile unit, generally denoted with 1. This has the character of a vehicle movable on the bedding, for instance a concrete layer, to be treated. The vehicle is indicated as being of crawler type with two driving tracks 2. As also indicated by the arrows 3 and 4 the vehicle is movable in opposite directions.

On the vehicle 1 is arranged an elongated guiding 5 and a carriage movable to and fro along this guiding and generally denoted with 6. A base portion 7 constitutes a part of the carriage 6. A tube-type jet member 8 is arranged on the base portion 7 for directing a high pressure jet of liquid against the bedding. The guiding 5 in operation is intended to make an angle, preferably substantially transverse, with the motion directions 3, 4 of the vehicle. The guiding 5, which may possess the character of one or more beams, is in the example substantially linear. Furthermore, the guiding 5 forms a part of a stand 9, which is mounted on the vehicle. The jet pipe 8 communicates via a conduit 10 with a source for delivering high pressure liquid, especially water, to the jet pipe. This high pressure source may be arranged on the vehicle 1 or on a separate carriage or the like.

Figures 4, 5, 6:
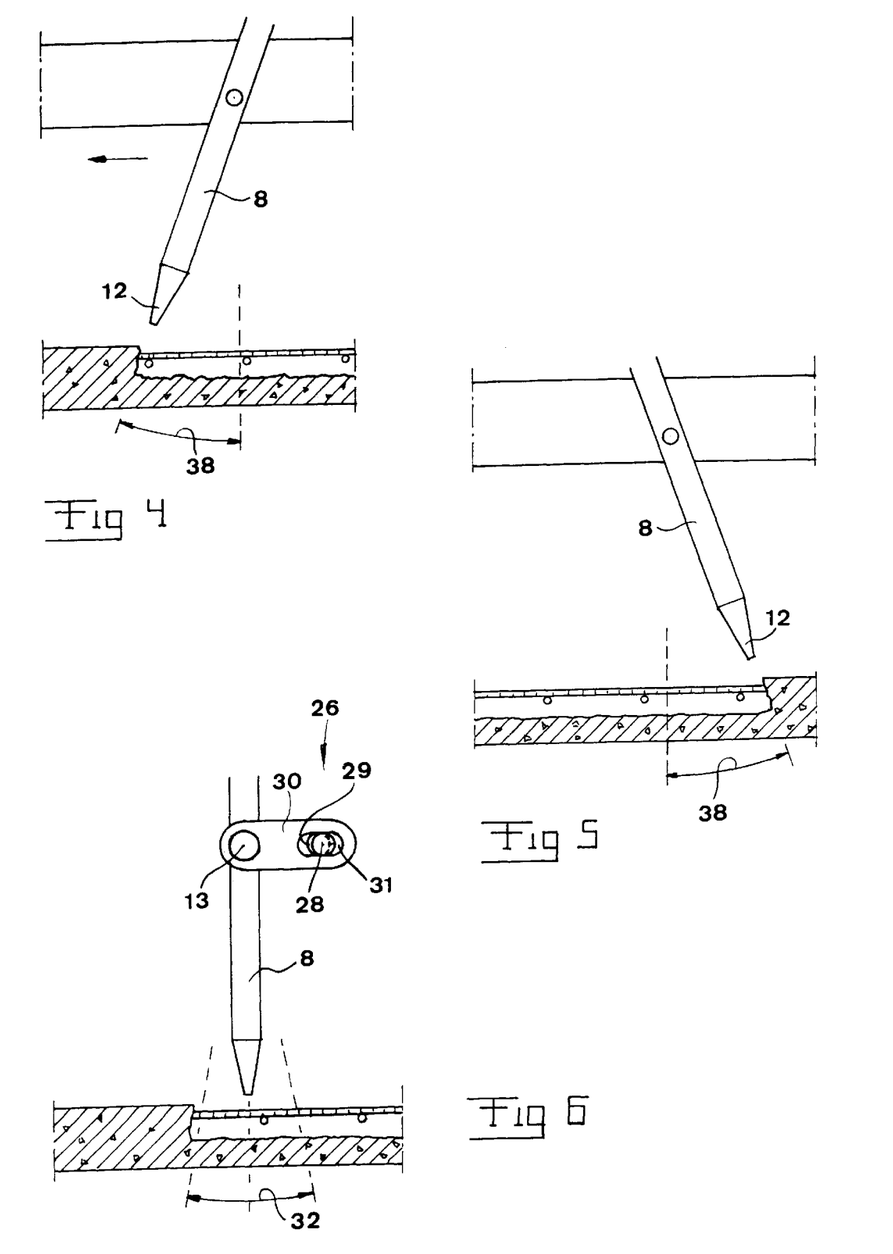
FIGS. 4 and 5 are schematic views of the jet member, which is illustrated in its both respective outer positions and is viewed perpendicularly to a guiding, along which the carriage is movable.
FIG. 6 is a schematic view of the jet member as seen substantially parallel with the guiding, in which a pivoting mechanism for the jet tube is indicated.

The jet pipe 8 is arranged pivotably in relation to the base portion 7 about an axis 11 between the outer positions as illustrated in FIGS. 4 and 5. This axis 11, in the example, is extending substantially transversely to the length direction of the guiding 5, and more exactly substantially in right angle to a plane, in which plane the guiding 5 is located and which plane extends perpendicularly to the underlying material layer to be treated.

In the outer positions, according to FIGS. 4 and 5, a nozzle 12 of the jet pipe 8 is pointing obliquely in relation to the length direction of the guiding 5. Then, the jet pipe may be arranged to point obliquely either in the same or in the opposite direction of the present motion direction of the carriage 6. The choice of the inclination direction of the jet pipe is due to the required treatment result and the character of the material. Below, in the description from now on the operation case will be treated where the nozzle 12 of the jet pipe, during motion of the carriage 6 along the guiding 5, always points in the motion direction of the carriage independent of in which direction the carriage, at present, is moving along the guiding.

Figures 2, 3:
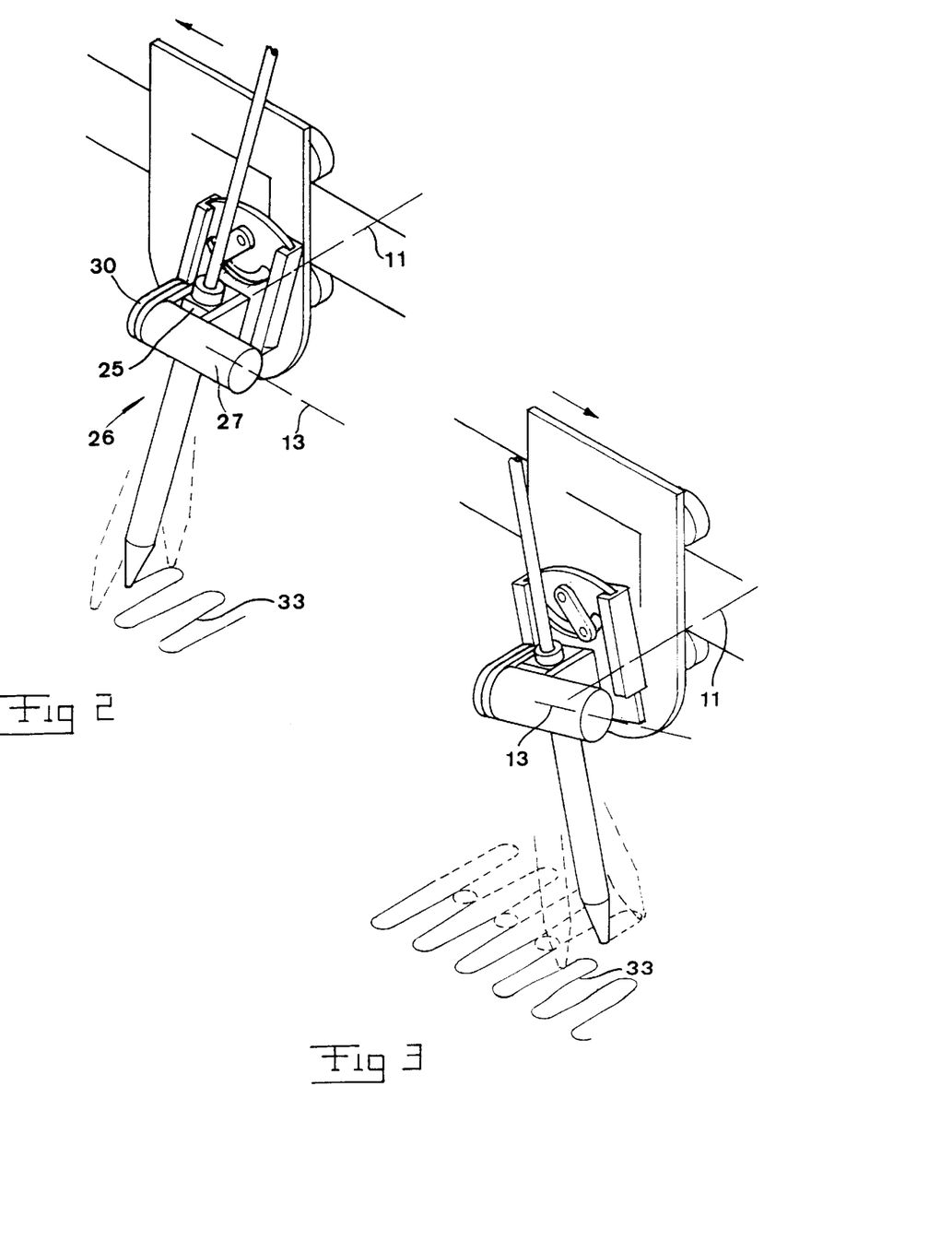
FIGS. 2 and 3 are schematic perspective views illustrating a carriage of the mobile unit carrying a jet member, in which the pattern of motion of the jet member is also illustrated.

It is suitably that the jet pipe 8 is adapted to make a pivoting motion in the motion direction 3, 4 of the vehicle 1 about an axis 13 (see FIGS. 2–3 and 6 for instance). In other words, this pivoting motion is intended to occur in planes substantially parallel to the pivoting axis 13 of the jet pipe 8.

The device comprises a driving arrangement, generally denoted with 14, for driving the carriage 6 along the guiding 5 and a driving arrangement 15 (FIG. 7) for pivoting the jet pipe 8 about the axis 11.

A control unit adapted for controlling the driving arrangements, for example a suitable computer, is adapted, when the carriage 6 has reached an end position along the guiding 5, to control the driving arrangement 15 to pivot the jet pipe 8 so that its nozzle during the motion of the carriage in both direction of motion will be pointing in these motion directions. The end positions of the carriage 6 are defined by sensor members 16 connected to the control unit. As indicated in FIG. 1, an arm like member 17 is fixedly arranged on the carriage 6 and intended to cooperate with the sensor members 16.

Figure 8:
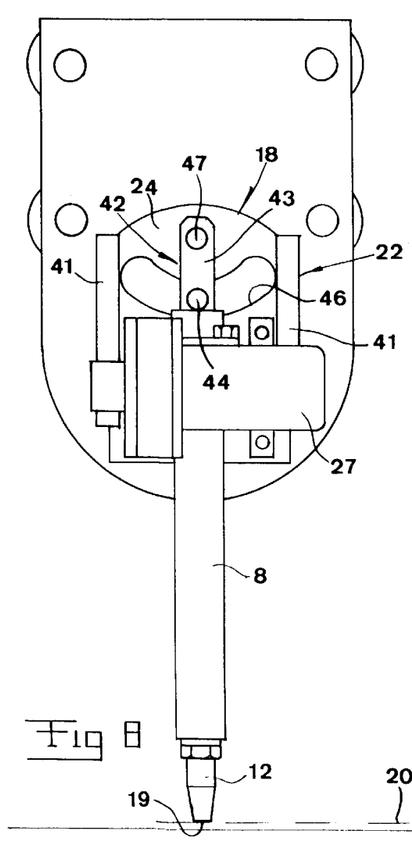
FIGS. 8–10 are views of the carriage in FIG. 7 as seen from the right and in different function positions.
Figure 9:
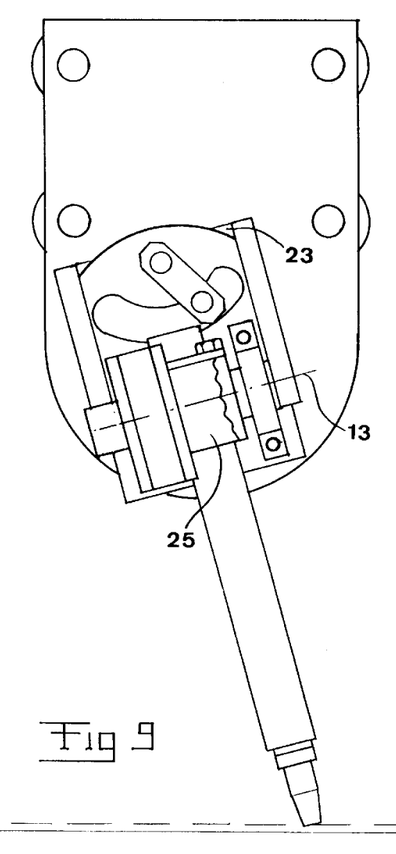
Figure 10:
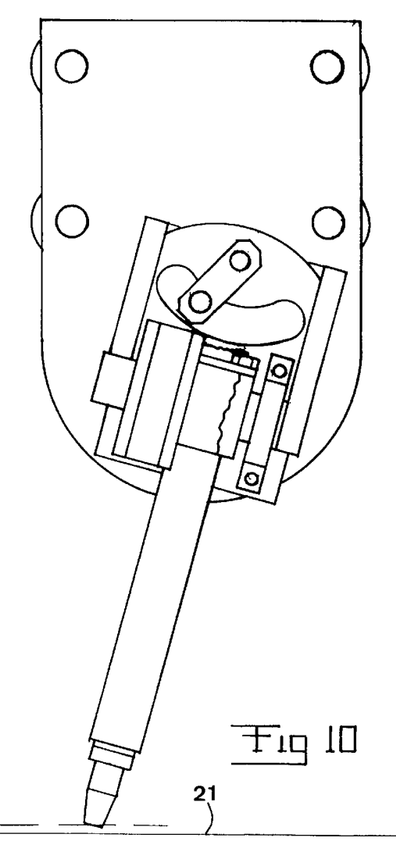

As also illustrated in FIGS. 8–10, the device comprises an arrangement 18 for displacing, during pivoting motion of the jet pipe 8, the jet pipe substantially parallel to its pivoting plane for the purpose of causing a point 19, in practice the mouth of the nozzle 12, to describe a motion in substantially one and the same plane 20 as a consequence of the combined pivoting/displacing. It appears clearly from FIGS. 8–10 how the mouth 19 of the nozzle 12 in different pivoting positions of the jet pipe 8 always will be situated in this plane 20. As seen, this plane 20, during operation, is located directly above the layer 21 to be subjected to treatment.

As will be described more in detail in the following, the jet pipe 8 is arranged on a carrier, generally denoted by 22, which by means of the driving arrangement 15 is pivotable in relation to the base portion 7 about the axis 11. The carrier 22 is formed by at least two parts, namely one first part 23, which is pivotably connected to the base portion 7 about the axis 11, and a second part 24, which carries t he jet pipe 8 (see particularly FIGS. 7–10). These both carrying parts 23, 24 are displaceable in relation to each other substantially parallel to the pivoting plane of the jet pipe.

An attachment 25 for the jet pipe 8 is arranged pivoting, about the axis 13, on the carrying part 24.

A driving arrangement 26 (FIGS. 2 and 6) for causing the pivoting of the jet pipe 8 about the axis 13 comprises a motor 27 and an excentric 28 driven by means of the motor. This excentric is intended to be brought in rotation about the axis of the motor 27 and presents a projection 29 excentric in relation to this axis, and acting on the attachment 25. More precisely, a lever arm 30 is rigidly attached to the attachment 25, which lever arm presents a slot 31, into which the projection 29 is engaging. Upon rotation of the excentric, the lever arm 30 thus will be put in a pivoting motion about the axis 13 and as a consequence of that the lever arm is fixed in relation to the attachment 25, the jet pipe 8 will be put in a pivoting motion, indicated by the arch 32, in planes making an angle, preferably a substantially right angle, with the extension of the guiding 5. In FIGS. 2 and 3 is illustrated, by means of the curvatures 33, how the combined pivoting motion about the axis 13 and the displacing motion of the carriage 6 along the guiding 5, give rise to a zigzag pattern. It is pointed out that the pivoting motion, in practise, is relatively small, which means that the variation of the distance between the nozzle 12 and the underlying material layer arising as a consequence of the pivoting motion is in this connection neglictible. Thus, this variation is of substantially less importance than the pivoting motion of the jet pipe about the axis 11.

Figure 7:
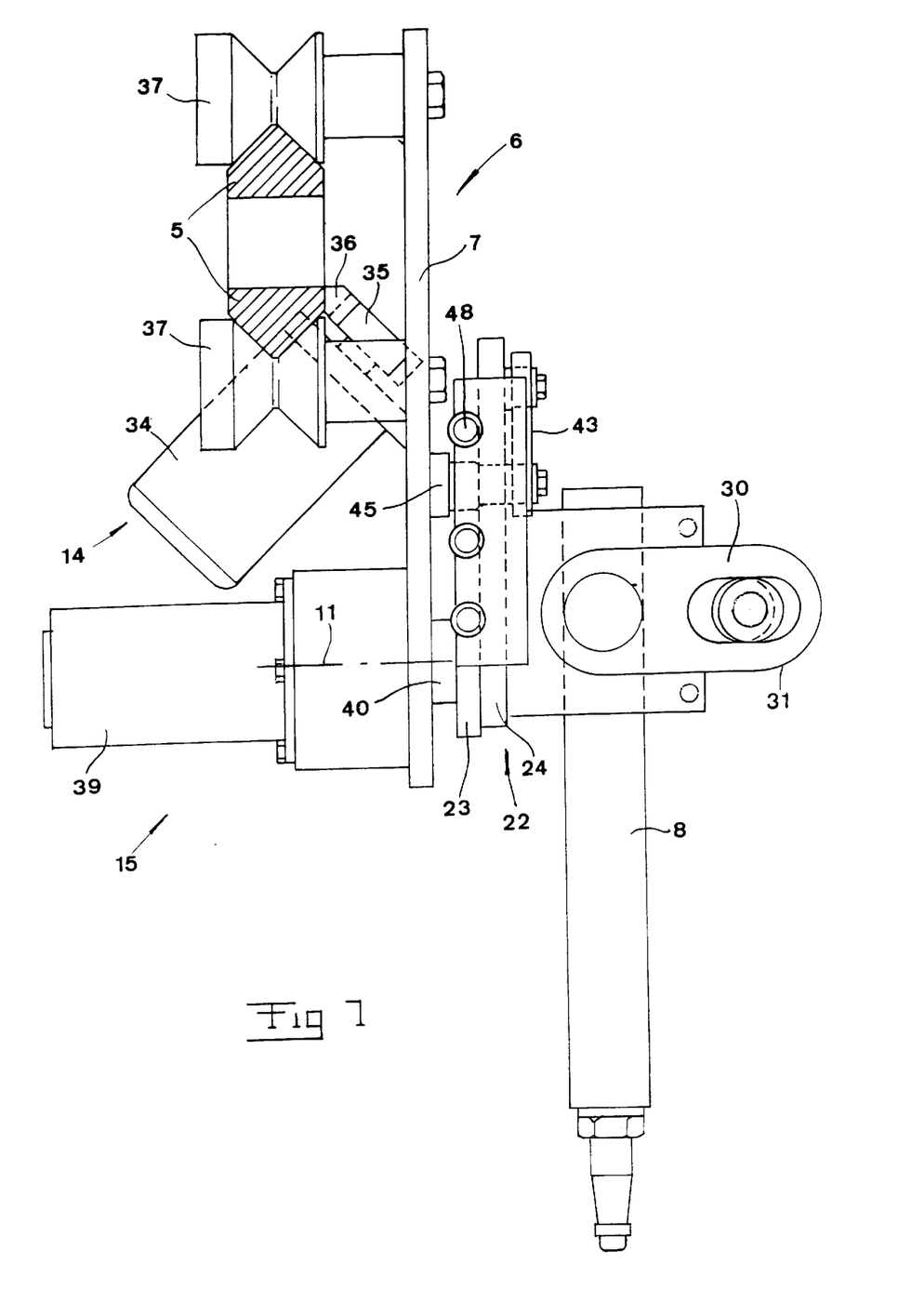
FIG. 7 is a side elevation of the carriage included in the device with components placed thereon.

Although other embodiments are well possible, the driving arrangement 14 for the motion of the carriage 6 along the guiding 5 may include a motor 34, a hydraulic motor for instance, which is arranged on the carriage 6 and which drives at least one wheel or gear 35, which gear is arranged rotatebly on the carriage 6 and engages drivingly with the guiding 5 or a member arranged thereon, for example in the form of a tread or a cog way 36. To control the carriage 6 in relation to the guiding 5 the carriage 6 presents suitable wheels 37 (FIG. 7).

The control unit of the device is arranged to control the driving arrangement 15, substantially at the same time as the carriage 6 is stopped in a first end position due to one of the sensor members 16, to initiate pivoting of the jet pipe 8 about the axis 11 with an angular velocity which results in a motion velocity of the nozzle 12 along the guiding 5 that is substantially as high as the motion velocity of the carriage 6 along the guiding, said control unit being arranged to control the driving arrangement 14 of the carriage 6 to initiate the carriage motion towards the other end position substantially at the same time as the pivoting of the jet pipe 8 by means of the driving arrangement 15 ends. In other words, the jet pipe 8 with its nozzle 12, will be in a substantially continuos motion with the same velocity along the guiding 5 throughout the turning event at the end position of the carriage.

It is in FIGS. 4 and 5 illustrated that the jet pipe 8, looked at parallely to the pivoting axis 11, is capable to pivot by angles 38 in opposite directions from a mid position, in which the jet pipe 8 is aligned as a perpendicular to the surface to be treated. The angle 38 is suitably at the most 25 to 30°.

The driving arrangement 15 (FIG. 7) comprises a motor 39, for example a hydraulic motor, which is secured in relation to the base portion 7, which base portion possess the character of a plate, and which is able to bring a shaft pivot 40 in a to and fro pivoting motion about the axis 11. This shaft pivot 40 is fixed with respect to rotation to the carrying part 23, which thus will be brought in a to and fro turning or pivoting motion between the positions by the motion of the shaft pivot 40, as illustrated in FIGS. 9 and 10. The first carrying part 23 is arranged, when pivoting, to carry the second carrying part 24 along. For this purpose are the carrying parts 23, 24 fixed with respect to rotation to each other about the axis 11, but they are displaceable in relation to each other substantially in right angle to the axis 11, i.e. substantially parallel with the pivoting plane of the jet pipe 8 about the axis 11. More precisely, the carrying parts 23, 24 present members 41 for controlling their relative motion. Thus, these members 41 control the carrying parts 23, 24 mutually so that their relative movability is limited to a substantially linear displacing motion. Although the guiding members 41, just as well, could be secured to the carrying part 24, the control members in the example are attached to side edges of the plate like carrying part 23 so that the other carrying part 24 will be held and controlled between these guiding members 41 and prevented from moving in the direction away from the carrying part 23 by means of portions of the guiding members 41 gripping over the side edges of the carrying part 24.

The displacing arrangement 18 comprises members 42 connected with the base portion 7, and arranged to actuate the second carrying part 24 to be displaced in relation to the first carrying part 23 when the latter is pivoting by means of the motor 39. The actuating members 42 form a connection between the base portion 7 and the second carrying part 24. This connection comprises a link 43 hingedly connected to the base portion 7 and the second carrying part 24. More exactly, this link 43 (FIG. 7) is at one end connected to the base portion 7 via a hinge 44. This is formed by a projection 45 (FIG. 7) arranged on the base portion 7, said projection passing through a slot 46 made in the carrying part 24 and connecting hingedly to the link 43 on the outside of the plate-like carrying part 24. At the second end of the link 43 said link, via a hinge 47, is connected to the carrying part 24.

It is obvious that the projection 45 on the base portion 7 also passes through a recess or an opening in the carrying part 23.

Besides, in FIG. 7 is illustrated members, denoted 48, for keeping the guiding members 41 in right position at the edges of the carrying part 23. These members 48 should have the character of screws or suchlike.

The pivoting motion of the carrier 22 in relation to the base portion 7 is suitably limited by adjustable stop mem-bers (not shown) arranged on the base portion 7, for example so that the position of the stop members and by that the size of the pivoting motion of the jet pipe 8, may be adjusted in the required manner.

It appears from FIGS. 8 to 10 that the jet pipe 8, starting from a mid position has to be displaced in the direction towards the surface 21 to be treated as the jet pipe is turning to one of the both outer positions (FIGS. 9 and 10) from this mid position so that the nozzle 12 will be able to remain in the plane denoted 20, i.e. being at a constant distance from the surface 21 to be treated. This function is executed by means of the displacing arrangement 18 in that way that when the carrying part 23 is pivoted by means of the motor 39 in any of the both possible directions, said displacing arrangement will force the carrying part 24 to be displaced in relation to the carrying part 23 in the direction towards the surface 21 and thus the jet pipe 8 connected to the carrying part 24 is carried along. As will be seen by comparison between FIGS. 8–10, the link 43 included in the displacing arrangement 18, according to this embodiment, will be inclined and by that excert such pulling on the carrying part 24 that displaces the same downwardly in relation to the carrying part 23. This is a consequence of that the hinge 44 of the link 43 is stationary in relation to base portion 7 whereas the second hinge 47 of the link is following the carrying part 24 when the latter is pivoting as a consequence of the pivoting of the carrying part 23 by means of the motor 39.

Moreover, it is illustrated in FIGS. 7–10 how an attachment 25 for the jet pipe 8 is pivotably movable in relation to the carrying part 24 about the axis 13, in which the motor 27 serves for generating the pivoting motion, said motor being already described by means of the earlier drawings, and the excentric driven by the motor received in the slot 31 of the lever arm 30.

Figure 11:
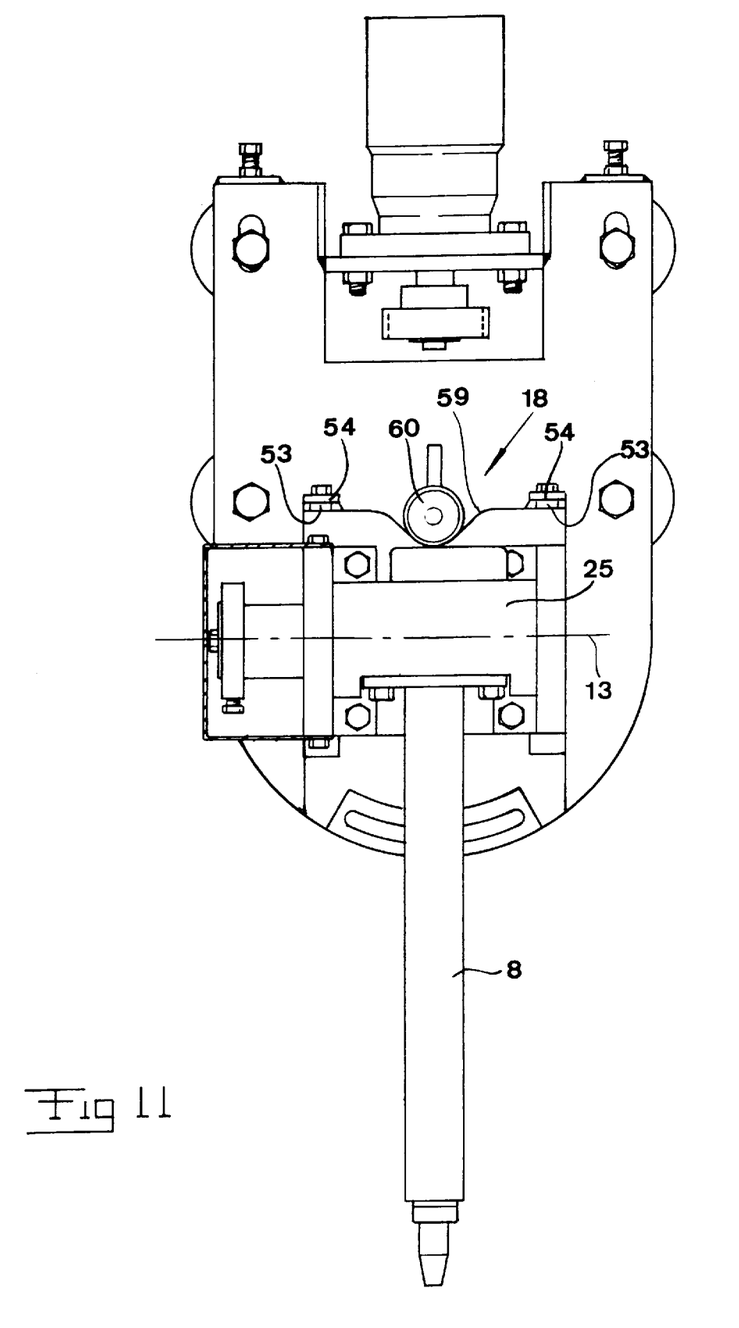
FIG. 11 is a front view similar to FIG. 8 of an alternative embodiment.
Figures 12, 13:
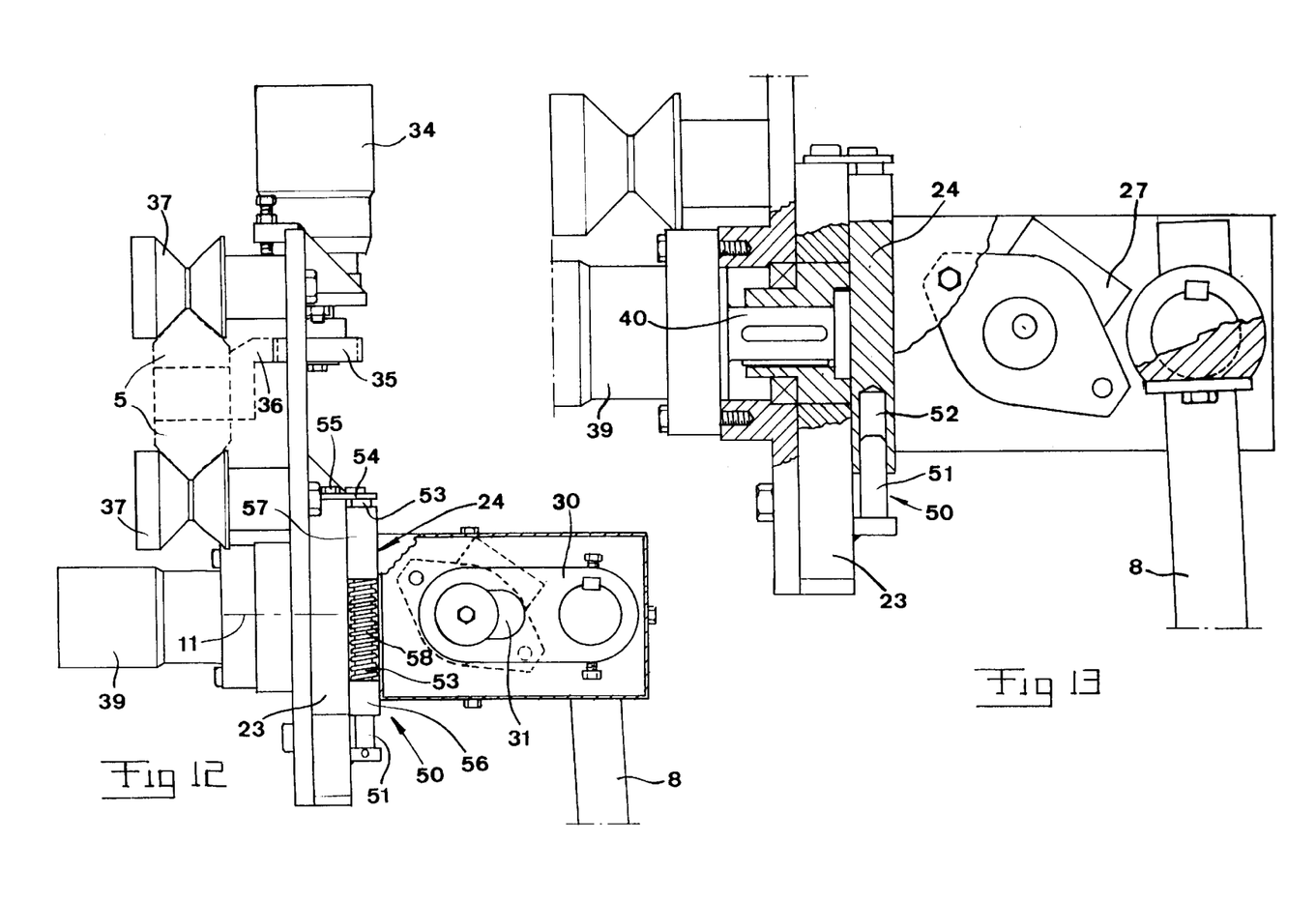
FIG. 12 is a view of the embodiment according to FIG. 11 as seen from the left.
FIG. 13 is a view in an enlarged scale of a part of that also appearing from FIG. 12, in addition the view in FIG. 13 is cut to show details not appearing in FIG. 12.

It is illustrated in FIGS. 11–14 an embodiment which function is similar to the function of the embodiment described above but is obtained partly by other means. In this figures only the carriage 6 itself, the wheels 37 of the carriage for co-operation with the guiding 5 and a motor 34 for driving the carriage along the guiding, for instance by the fact that the motor drives a gear wheel 35 cooperating with a cog way 36 on the guiding 5, are illustrated. As in the embodiment described just before, a motor 39 is arranged to bring a carrying part 23 in a pivoting motion about the axis 11. A carrying part 24 is arranged to be carried along when pivoting the carrying part 23 but it is displaceable in relation to the carrying part 23 parallely with the pivoting plane of the jet pipe 8. It is illustrated in FIG. 13 how the motor 39 is arranged to bring a shaft pivot 40 in a pivoting motion to and fro. The carrying part 23, which is plate-like, is unturnably connected with this shaft pivot 40. There are means 50 for limiting the freedom of motion of the carrying part 24 in relation to the carrying part 23 to a substantially linear displacing motion to an fro, i.e. to prevent relative turning or pivoting of the carrying parts 23, 24. It is shown in FIG. 13 how such means 50 may possess the character of a guiding rod 51 rigidly attached to the carrying part 23 and displaceably received in a suitable hole 52 in the carrying part 24. As illustrated in FIG. 12, other such means may comprise a guiding axis 53, the upper end of said guiding axis is fixed in relation to the carrying part 23, for example by means of a plate-like member 54, which member is attached to the upper end of the guiding axis 53 and by means of a fastening member 55, for instance a screw, is attached to the upper part of the carrying part 23. The lower part of the guiding axis 53 is received guidedly in a hole carried out in a portion 56 rigidly connected with the carrying part 23. The second carrying part 24 presents a sleeve portion 57 gripping the guiding axis 53. A spring 58, for example a screwpressure-spring, acts between the carrying parts 23, 24 to influence the second carrying part 24 in relation to the first 23 in a first direction. The spring 58 in the example is illustrated as a screwpress-spring arranged around the guiding axis 53 and acting with its both opposite ends against the underside of the sleeve portion 57 and against the upside of the portion 56, respectively. This displacing arrangement, in this embodiment, comprises a guiding curve 59 and a curve following member 60. Although the guiding curve 59 would be able to be arranged on the base portion 7 and the curve following member 60 on the second carrying part 24, the embodiment is inverted in the illustrated example in the meaning that the guiding curve 59 is made on the carrying part 24 whereas the curve following member 60 instead is stationary arranged on the base portion 7. With "stationary" herein the lack of movability is intended, but nevertheless such mobility which means that the location of the curve following member 60 is not changed is allowed. Thus, for example, the curve following member 60 may be formed by a wheel rotatebly supported about an axis 61 to minimise the friction in relation to the guiding curve 59. As earlier mentioned, the spring 58 acts on the second carrying part 24 in a first direction. This first direction is such that the guiding curve 59 is actuated to abut against the curve following member 60. The guiding curve 59 is shaped in a way so it presents, when the jet pipe 8 is situated in the mid position, a cavity 62 placed opposite to the curve following member 60. On each side of this cavity 62, the guiding curve 59 presents flanks 63 directed upwardly.

As illustrated in FIG. 11, in the example, double sets of guiding axes 53 are arranged at two side edges of the carrying parts 23, 24. The guiding rod 51, illustrated in FIG. 3, is intended to be singular and adapted in the area between the guiding axes 53.

As was the case in the earlier embodiment, the jet pipe 8 is attached to an attachment 25, which is pivotably supported in relation to the carrying part 24 so as to allow pivoting of the jet pipe 8 about the axis 13. The motor 27, illustrated in FIG. 13, is arranged in the same manner as in the earlier embodiment to bring an excentric into rotation. This excentric is received in a slot 31 carried out in a lever arm 30, which is unturnably connected with the jet pipe 8.

Figure 14:
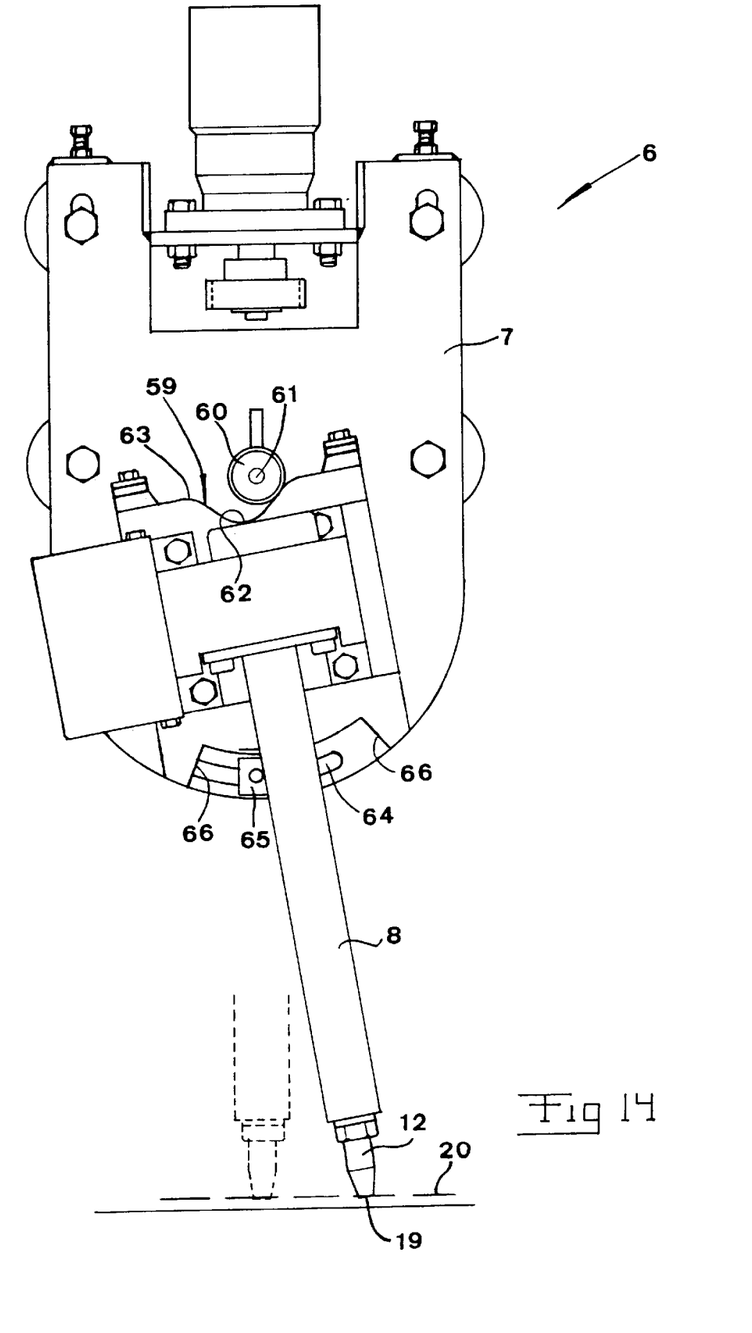
FIG. 14 is a view similar to FIG. 11 but showing another function position.

It is illustrated in FIG. 14 how a slot 64 is arranged in the base plate 7 and along which a stop member 65 is able to be displaced and fixed in desired positions. This stop member 65 works as a limit for the pivoting motion of the carrying part 23 by cooperating with stop surfaces 66 shaped on the carrying part 23.

When, according to the embodiment in FIGS. 11–14, the carrying part 23 is pivoted about the axis 11 by means of the motor 39, the carrying part 24 will be carried along compulsory in this pivot motion. This will imply a pivoting motion of the jet pipe 8. At the same time as this pivoting motion, the guiding curve 59 of the carrying part 24 will by the contact with the curve following member 60, however, be pressed downwardly together with the carrying part 24 in its entirety, since the curve following member 60 rolls up along the upwardly directed flank 63 of the guiding curve. This displaces the carrying part 24 downwards in relation to the carrying part 23, something that in turn means that the mouth 19 of the nozzle 12 on the jet pipe 8 will keep its position in the plane 20, of course, assuming that the guiding curve 59 is shaped so that the arched motion directed upwardly, that would arise if the jet pipe 8 was describing a pure pivoting motion, is neutralised by a displacement downwardly of the jet pipe.

The invention such it is described implies thus that the mouth of the nozzle 12 on the jet pipe 8 will have a substantially constant distance to the surface to be treated throughout the laps of the treatment, i.e. not only when the jet pipe 8, during motion of the carriage 6, is kept stationary as far as the motion about the axis 11 is concerned, but even when the jet pipe 8 is turned in the end positions of the carriage 6. This means constant treatment conditions and thus regularity with respect to the working result. Furthermore, this invention makes it possible to place the nozzle of the jet pipe closer to the surface which will be treated.

It is obvious that what is described above should be considered only as an example of how the invention may be implemented. Thus, the invention may of course be modified within the frame for the idea of the invention, that will appear from a reasonable interpretation of the appended claims.

What is claimed is:

1. A device for moving an object (8), which object is pivotably arranged in relation to a base portion (7) about an axis (11), characterized in that the device comprises an arrangement (18) for displacing, during pivoting motion of the object (8), the object substantially parallel to its pivoting plane for the purpose of causing a point (19) at the object to describe a motion in substantially one and the same plane (20) as a consequence of the combined pivoting/displacing, said object constituted by a member for material removing treatment of a layer.

2. A device according to claim 1, characterized in that the object (8) is arranged on a carrier (22), being by means of a driving arrangement (15) pivotable in relation to the base portion (7) about the axis (11), and that the carrier is formed by at least two parts, namely one first part (23) which is pivotably connected to the base portion (7), and a second part (24) which carries the object (8), and that the two carrying parts are displaceable in relation to each other.

3. A device according to claim 2, characterized in that the first carrying part (23) is arranged, when pivoting, to carry the second carrying part (24) along.

4. A device according to claim 3, characterized in that the displacing arrangement (18) is adapted, when the first carrying part (23) is pivoting, to displace the second carrying part (24) in relation to the first carrying part.

5. A device according to claim 4, characterized in that the displacing arrangement (18) comprises a member (43; 60), connected to the base portion, and arranged to actuate the other carrying part (24) to be displaced in relation to the first carrying part (23) when the first carrying Dart is pivoting.

6. A device according to claim 5, characterized in that actuating members (43) form a connection between the base portion (7) and the second carrying part (24).

7. A device according to claim 6, characterized in that the connection comprises a link (43) hingedly connected to the base portion (7) and the second carrying part (24).

8. A device according to claim 4, characterized in that the displacing arrangement (18) comprises a guiding curve (59) and a curve following member (60) and that the guiding curve or curve following member is arranged on the second carrying part (24) whereas the curve following member (60) or the guiding curve (59) is arranged on the base portion (7).

9. A device according to claim 8, characterized in that the guiding curve (59) and curve following member (60) are actuated to abut against each other by means of one or more springs (58).

10. A device according to claim 3, characterized in that the two carrying parts (23, 24) are mutually guided to be displaced substantially in a linear relation to each other.

11. A device according to claim 1, whereby the object (8) is constituted by a member for treating a material layer, characterized in that the treating member (8) is constituted by a jet member to direct a jet against the material layer.

12. A device according to claim 1, characterized in that the base portion (7) constitutes a part of a carriage (6) movable to and fro along a guiding (5).

13. A device according to claim 12, characterized in that the guiding (5) is arranged on a mobile unit (1) and that this presents mobility in a direction making an angle with the guiding (5).

14. A method for moving an object according to claim 13, characterized in that the guiding (5) is arranged on a mobile unit (1) to present mobility in a direction making a substantially right angle.

15. A method for moving an object (8), said method includes pivoting of the object in relation to a base portion (7) about an axis (11), characterized in that the object (8) during pivoting about the axis is displaced substantially parallel with its pivoting plane for the purpose of causing a point (19) at the object (8) to describe a motion in substantially one and the same plane (20), said object being constituted by a member for material removing treatment of a layer.

16. A device for moving an object (8), which object is pivotably arranged in relation to a base portion (7) about an axis (11), characterized in that the device comprises:

an arrangement (18) for displacing, during pivoting motion of the object (8), the object substantially parallel to its pivoting plane for the purpose of causing a point (19) at the object to describe a motion in substantially one and the same plane (20) as a consequence of the combined pivoting/displacing, and the object (8) being arranged on a carrier (22) by means of a driving arrangement (15) pivotable in relation to the base portion (7) about the axis (11), and the carrier being formed by at least two parts, namely one first part (23) which is pivotably connected to the base portion (7), and a second part (24) which carries the object (8), and the two carrying parts are displaceable in relation to each other, said object being constituted by a member for material removing treatment of a layer.

17. A device according to claim 16, characterized in that the first carrying part (23) is arranged, when pivoting, to carry the second carrying part (24) along.

18. A device according to claim 17, characterized in that the displacing arrangement (18) is adapted, when the first carrying part (23) is pivoting, to displace the second carrying part (24) in relation to the first carrying part.

19. A device according to claim 18, characterized in that the displacing arrangement (18) comprises a guiding curve (59) and a curve following member (60) and that one of the guiding curve or curve following member is arranged on the second carrying part (24) whereas the other of the curve following member (60) or the guiding curve (59) is arranged on the base portion (7).

20. A device according to claim 19, characterized in that the guiding curve (59) and curve following member (60) are actuated to abut against each other by means of one or more springs (58).

21. A device according to claim 17, characterized in that the two carrying parts (23, 24) are mutually guided to be displaced substantially in a linear relation to each other.

22. A device according to claim 16, characterized in that the base portion (7) constitutes a part of a carriage (6) movable to and fro along a guiding (5).

23. A device according to claim 22, characterized in that the guiding (5) is arranged on a mobile unit (1) presenting mobility in a direction making an angle with the guiding (5).

* * * * *